(12) United States Patent  (10) Patent No.: US 8,702,978 B2
Yokokawa et al.  (45) Date of Patent: Apr. 22, 2014

(54) SEAWATER DESALINATION APPARATUS AND CHEMICAL INJECTION APPARATUS

(75) Inventors: Katsuya Yokokawa, Fuchu (JP); Takeshi Matsushiro, Yokohama (JP); Ryo Namba, Fuchu (JP); Hideaki Yamagata, Urayasu (JP); Koichi Matsui, Tokyo (JP); Futoshi Kurokawa, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 13/185,782

(22) Filed: Jul. 19, 2011

(65) Prior Publication Data

US 2012/0067791 A1  Mar. 22, 2012

(30) Foreign Application Priority Data

Sep. 16, 2010 (JP) ................. 2010-208538

(51) Int. Cl.
*B01D 61/04* (2006.01)
*B01D 61/12* (2006.01)
*B01D 65/00* (2006.01)

(52) U.S. Cl.
USPC ......... 210/85; 210/96.2; 210/143; 210/195.2; 210/199; 210/639; 210/652

(58) Field of Classification Search
USPC ............. 210/85, 96.2, 143, 195.2, 638, 639, 210/652, 739, 743, 805, 199, 752
See application file for complete search history.

(56) References Cited

U.S. PATENT DOCUMENTS 3,275,533 A * 9/1966 Boronkay ................. 205/788.5
3,308,041 A * 3/1967 Strickler ................... 205/788.5
4,574,049 A * 3/1986 Pittner ........................ 210/639
4,579,049 A * 4/1986 Rodrigues .................. 99/289 R
5,766,479 A * 6/1998 Collentro et al. ........... 210/639

(Continued)

FOREIGN PATENT DOCUMENTS

| JP | 8-206460 | 8/1996 |
| JP | 8-294688 | 11/1996 |
| JP | 10-85743 | 4/1998 |
| JP | 10-314735 | 12/1998 |
| JP | 11-10146 | 1/1999 |
| JP | 11-138165 | 5/1999 |
| JP | 2000-218263 | 8/2000 |
| JP | 2007-321174 | 12/2007 |
| JP | 2008-149226 | 7/2008 |
| WO | WO 2012/050265 | 4/2012 |

OTHER PUBLICATIONS

First Office Action for Japanese Patent Application No. 2010-208538, mailed Aug. 7, 2012, from the Japanese Patent Office, and English translation thereof (7 pages).

Patent Examination Report No. 1 and Search Information Statement for Australian Patent Application No. 2011204910, dated Sep. 14, 2012 (4 pages).

*Primary Examiner* — Joseph Drodge
(74) *Attorney, Agent, or Firm* — Finnegan, Henderson, Farabow, Garrett & Dunner, L.L.P.

(57) ABSTRACT

According to one embodiment, a apparatus includes a controller configured to obtain values measured by a first sensor and a second sensor, receive pH target values at the entrance of a first reverse osmosis membrane and at the entrance of a second reverse osmosis membrane, and use a transfer function from the acid injection to pH at the entrance of the first reverse osmosis membrane, a transfer function from the alkaline injection to pH at the entrance of the first reverse osmosis membrane, a transfer function from the acid injection to pH at the entrance of the second reverse osmosis membrane, and a transfer function from the alkaline injection to pH at the entrance of the second reverse osmosis membrane, to control an injection rate of the acid injected from a first injection device and an injection rate of the alkali injected from a second injection device.

3 Claims, 6 Drawing Sheets

(56) References Cited

U.S. PATENT DOCUMENTS

| | | | |
|---|---|---|---|
| 5,925,255 A * | 7/1999 | Mukhopadhyay | 210/652 |
| 6,113,797 A * | 9/2000 | Al-Samadi | 210/652 |
| 6,126,834 A * | 10/2000 | Tonelli et al. | 210/652 |
| 6,303,037 B1 * | 10/2001 | Tamura et al. | 210/652 |
| 7,097,769 B2 * | 8/2006 | Liberman et al. | 210/652 |
| 7,438,817 B2 * | 10/2008 | Nagghappan et al. | 210/639 |
| 7,618,538 B2 * | 11/2009 | Palacios Donaque et al. | 210/652 |
| 7,981,295 B2 * | 7/2011 | Al-Samadi | 210/652 |
| 2006/0065598 A1 * | 3/2006 | Comstock | 210/639 |
| 2008/0164209 A1 * | 7/2008 | Zacerkowny et al. | 210/652 |

* cited by examiner

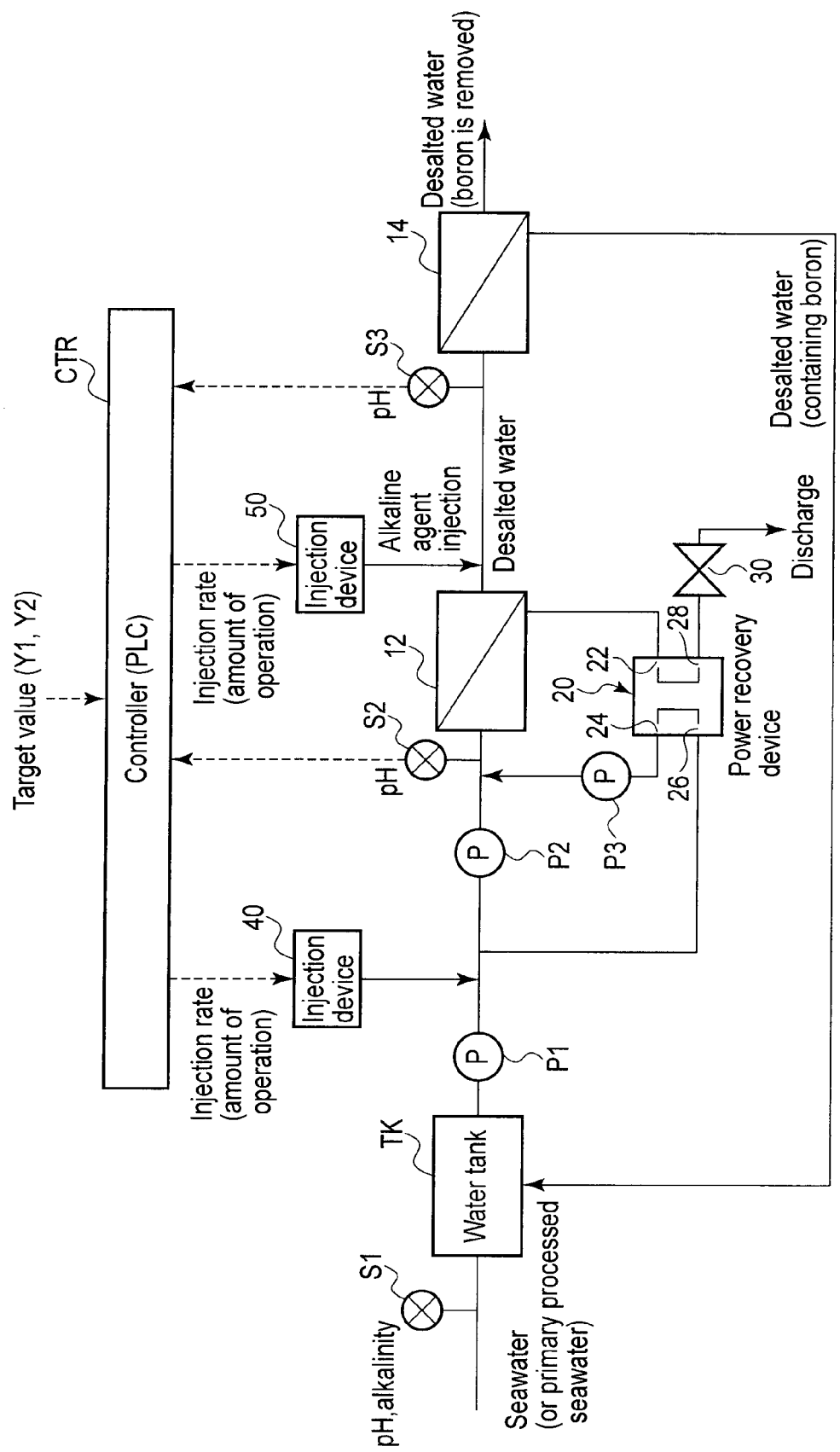
F I G. 1

$$\lambda_{11}(s) = \frac{\left.\dfrac{Y_1(s)}{U_1(s)}\right|_{open}}{\left.\dfrac{Y_1(s)}{U_1(s)}\right|_{closed}} = \frac{P_{11}P_{22}}{P_{11}P_{22}-P_{12}P_{21}}$$

F I G. 7

US 8,702,978 B2

SEAWATER DESALINATION APPARATUS AND CHEMICAL INJECTION APPARATUS

CROSS-REFERENCE TO RELATED APPLICATIONS

This application is based upon and claims the benefit of priority from prior Japanese Patent Application No. 2010-208538, filed Sep. 16, 2010, the entire contents of which are incorporated herein by reference.

FIELD

Embodiments described herein relate generally to a seawater desalination apparatus and a chemical injection apparatus.

BACKGROUND

As water issues are becoming serious all over the world, water business is regarded as a huge market, and international competition in water business is accelerating. In Middle Eastern countries where there is no water source of surface water such as rivers and groundwater, or in regions in our country where water shortage is highly possible, seawater desalination techniques are introduced in order to secure water source, and large seawater desalination plants are installed.

Seawater desalination methods in actual use include a method called evaporation method for obtaining fresh water by evaporating seawater and a membrane method for filtering seawater at a high pressure using a reverse osmosis membrane (hereinafter referred to as RO membrane). In the membrane method, seawater whose pressure is boosted by a high-pressure RO pump is passed through an RO membrane, so that the seawater is desalinated. The desalination cost of the membrane method is less expensive than that of evaporation methods in general. Therefore, the membrane method is now widely spread in place of the evaporation method.

By the way, one-stage RO membrane separation processing may not reduce boron contained in seawater (4 to 6 mg/L) to a level satisfying a reference value (drinking water reference level 1.0 mg/L, or 0.3 mg/L defined by WHO). In such a case, there are some plants, in which alkaline agent is added to the water processed by the one-stage RO membrane, so that the water is processed in two stages of RO membranes (hereinafter referred to as two-stage RO membranes).

It should be noted that since boron exists as a weak electrolyte boric acid and changes according to pH, boron stopping rate of the second stage RO membranes is required to achieve a boron concentration corresponding to drinking water reference level of 1.0 ppm (0.3 ppm defined by WHO) by adjusting pH to 9.0 to 10.0.

In order to prevent calcium scale film with the first stage RO membrane, pH at the entrance of the first stage RO membrane needs to be adjusted to 6.5 to 7.0 by injecting acid such as sulfuric acid and hydrochloric acid (pH of seawater is about 8.0 to 8.5).

As shown in the expression below, the equilibrium position may be shifted to the left by adding $H^+$ as acid, so that calcium carbonate can be dissolved.

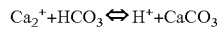

$$Ca_2^+ + HCO_3 \Leftrightarrow H^+ + CaCO_3$$

BRIEF DESCRIPTION OF THE DRAWINGS

FIG. 1 is a diagram schematically illustrating an example of the configuration of a seawater desalination apparatus according to a first embodiment;

FIG. 7 is a diagram for illustrating an example of an index of a response sensitivity of pH with respect to change of an injection rate used in the seawater desalination apparatus shown in FIG. 6.

DETAILED DESCRIPTION

Figure 2:
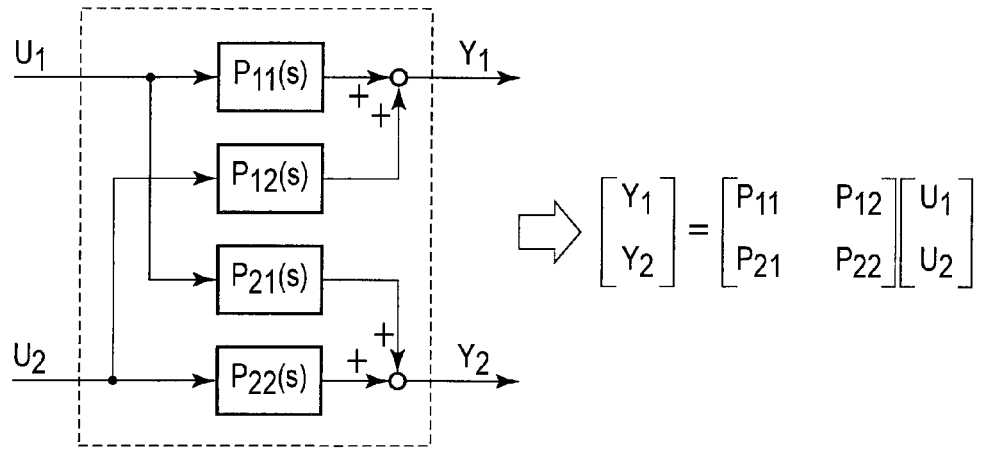
FIG. 2 is a diagram for illustrating an example of a method for calculating an acid injection rate and an alkaline injection rate in the seawater desalination apparatus shown in FIG. 1.
Figure 3:
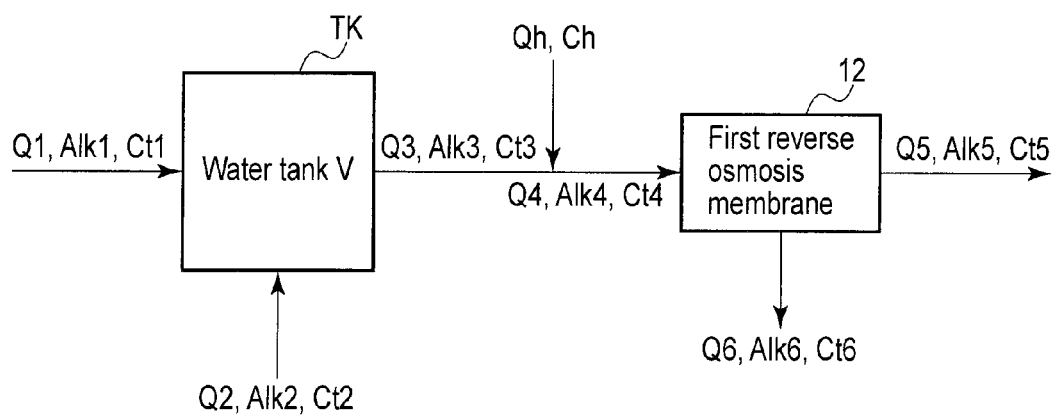
FIG. 3 is a diagram for illustrating an example of a method for calculating a transfer function used for calculating the acid injection rate and the alkaline injection rate as shown in FIG. 2.

In general, according to one embodiment, a seawater desalination apparatus includes a first reverse osmosis membrane that filters seawater to separate seawater into desalted water and concentrated seawater, and discharges the desalted water and the concentrated seawater, a second reverse osmosis membrane that filters the desalted water to remove boron, a first injection device that injects acid into a stage previous to the first reverse osmosis membrane, a second injection device that injects alkali to a stage previous to the second reverse osmosis membrane, a first sensor that measures pH at an entrance of the first reverse osmosis membrane, a second sensor that measures pH at an entrance of the second reverse osmosis membrane, and a controller configured to obtain values measured by the first sensor and the second sensor, receive a pH target value at the entrance of the first reverse osmosis membrane and a pH target value at the entrance of the second reverse osmosis membrane, and use a transfer function from the acid injection to pH at the entrance of the first reverse osmosis membrane, a transfer function from the alkaline injection to pH at the entrance of the first reverse osmosis membrane, a transfer function from the acid injection to pH at the entrance of the second reverse osmosis membrane, and a transfer function from the alkaline injection to pH at the entrance of the second reverse osmosis membrane, to control an injection rate of the acid injected from the first injection device and an injection rate of the alkali injected from the second injection device.

Embodiments will be hereinafter explained with reference to the drawings.

FIG. 1 is a diagram schematically illustrating an example of the configuration of a seawater desalination apparatus and a chemical injection apparatus according to a first embodiment. The seawater desalination apparatus according to the present embodiment includes a water tank TK, a water pump P1, a high-pressure pump P2, a booster pump P3, a power recovery device 20, a brine flow amount adjustment valve (discharge valve) 30, a first reverse osmosis (RO) membrane 12, a second reverse osmosis (RO) membrane 14, a controller CTR, a first injection device 40 for injecting chemical by adjusting the amount of injection of chemical, a second injection device 50, a sensor (third sensor) S1, a sensor (first sensor) S2, and a sensor (second sensor) S3. The chemical injection apparatus includes a controller CTR, a first injection device 40, and a second injection device 50. It should be noted that the seawater desalination apparatus includes various kinds of valves, which are omitted in FIG. 1.

The water pump P1 sucks seawater or primary processed seawater (sterilized or clarified seawater) from the water tank TK, and pumps the seawater into the seawater desalination apparatus. The seawater discharged from the water pump P1 is provided to the high-pressure pump P2 and the power recovery device 20.

The high-pressure pump P2 boosts the pressure of the seawater supplied by the water pump P1 to a high-pressure state (for example, about 6 MPa), and discharged the high-pressure seawater. The seawater discharged from the high-pressure pump P2 is supplied to the first reverse osmosis membrane 12.

The first reverse osmosis membrane 12 and the second reverse osmosis membrane 14 filter the seawater to remove dissolved substances such as ions and salts contained in the seawater, thus generating desalted water. The desalted water filtered by the first reverse osmosis membrane 12 is supplied to the second reverse osmosis membrane 14. The second reverse osmosis membrane 14 further removes boron from the supplied desalted water, and discharges the desalted water. The brine water of the second reverse osmosis membrane 14 is stored in the water tank TK.

The salt content removed by the first reverse osmosis membrane 12 is discharged as concentrated seawater at a high-pressure. The concentrated seawater discharged from the first reverse osmosis membrane 12 is supplied to the power recovery device 20. For example, the power recovery device 20 is a displacement-type power recovery device. The power recovery device 20 includes a high-pressure side inlet 22, a high-pressure side outlet 24, a low-pressure side inlet 26, and a low-pressure side outlet 28.

The power recovery device 20 uses the pressure energy included in the concentrated seawater to boost the pressure of the seawater flowing from the water pump P1 through the low-pressure side inlet 26, and outputs the seawater to the booster pump P3. The power recovery device 20 discharges the concentrated seawater, from which the pressure energy has been collected, via the low-pressure side outlet 28 and the discharge valve 30.

In other words, the concentrated seawater discharged from the first reverse osmosis membrane 12 is supplied to the high-pressure side inlet 22. After the pressure energy of the concentrated seawater is collected, the concentrated seawater is discharged via the low-pressure side outlet 28. Seawater is supplied to the low-pressure side inlet 26 via the water pump P1. This seawater is discharged from the high-pressure side outlet 24 using pressure (power) of the concentrated seawater. The seawater discharged from the high-pressure side outlet 24 is supplied to the booster pump P3.

For example, the discharge valve 30 is a brine flow amount adjustment valve, and is provided as an actuator for the purpose of adjusting the amount of flow of the concentrated seawater. The degree of valve opening of the discharge valve 30 is controlled on the basis of a control signal given by the controller CTR.

The booster pump P3 boosts the pressure of the seawater given by the power recovery device 20 to almost the same pressure as that of the seawater given by the high-pressure pump P2. Then, the boosted seawater discharged from the booster pump P3 is combined with the seawater given by the high-pressure pump P2, and the combined seawater is fed to the first reverse osmosis membrane 12.

The first injection device 40 injects acid such as sulfuric acid and hydrochloric acid to the flow path so as to adjust pH at the entrance of the first reverse osmosis membrane 12. The first injection device 40 is configured to inject acid to the flow path between the water pump P1 and the high-pressure pump P2.

The second injection device 50 injects an alkaline agent to the flow path so as to adjust pH at the entrance of the second reverse osmosis membrane 14. The second injection device 50 is configured to inject the alkaline agent to the flow path between the exit of the first reverse osmosis membrane 12 and the entrance of the second reverse osmosis membrane 14.

The sensor S1 is provided at a stage previous to the water tank TK, and measures pH and alkalinity of the seawater (or the primary processed seawater). The sensor S2 is provided in proximity to the entrance of the first reverse osmosis membrane 12, and measures pH of the seawater (or the primary processed seawater). The sensor S3 is provided in proximity to the entrance of the second reverse osmosis membrane 14, and measures pH of the desalted water. The pH values measured by the sensor S2 and the sensor S3 are transmitted to the controller CTR.

The controller CTR is configured to monitor the pH values received from the sensors S2, S3, and control the acid injection rate and the alkaline injection rate by multivariable control having two inputs and two outputs such as cross limit control and optimal regulator.

FIG. 2 shows a diagram for illustrating a control method using the controller CTR. The controller CTR receives a target value Y1 of pH at the entrance of the first reverse osmosis membrane 12 and a target value Y2 of pH at the second reverse osmosis membrane 14. The controller CTR uses transfer functions P11, P12, P21, P22 to calculate an acid injection rate U1 and an alkaline injection rate U2 from the target values Y1, Y2. The relationship between the target values Y1, Y2 and the rate (the acid injection rate U1 and the alkaline injection rate U2) can be represented as the following expression (1) using the transfer functions P11, P12, P21, P22.

$$\begin{bmatrix} Y_1 \\ Y_2 \end{bmatrix} = \begin{bmatrix} P_{11} & P_{12} \\ P_{21} & P_{22} \end{bmatrix} \begin{bmatrix} U_1 \\ U_2 \end{bmatrix} \qquad \text{expression (1)}$$

The transfer function P11 is a transfer function from the acid injection to pH at the entrance of the first reverse osmosis membrane 12. The transfer function P12 is a transfer function from the alkaline injection to pH at the entrance of the first reverse osmosis membrane 12. The transfer function 21 is a transfer function from the acid injection to pH at the entrance of the second reverse osmosis membrane 14. The transfer function 22 is a transfer function from the alkaline injection to pH at the entrance of the second reverse osmosis membrane 14.

In this case, the transfer functions P11, P12, P21, P22 are calculated from a mixing model obtained by modeling mixing process of seawater at the water tank TK, an acid injection model obtained by modeling alkalinity immediately after the acid injection, an alkaline injection model obtained by modeling alkalinity immediately after the alkaline injection, and an RO membrane ion separation model obtained by modeling ion separation at the reverse osmosis membrane. The transfer functions P11, P12, P21, P22 are determined based on the characteristics of the seawater supplied to the water tank TK, and therefore, they may be calculated once when the seawater desalination apparatus is installed.

The mixing model is established as follows using conservation of physical balance between the alkalinity, i.e., a summation of concentrations of proton accepting substances in the water tank TK, and the total carbon dioxide concentration included in the solution.

It should be noted that Q1 denotes the volume of seawater flowing into the water tank TK, Alk1 denotes the alkalinity of seawater (raw seawater) flowing into the water tank TK, and Ct1 denotes the total carbon dioxide concentration of the seawater flowing into the water tank TK. Q2 denotes the volume of brine water of the second reverse osmosis membrane 14, Alk2 denotes the alkalinity of the brine water of the second reverse osmosis membrane 14, and Ct2 denotes the total carbon dioxide concentration of the brine water of the second reverse osmosis membrane 14. Q3 denotes the volume of seawater discharged from the water tank TK, Alk3 denotes the alkalinity of the seawater discharged from the water tank TK, and Ct3 denotes the total carbon dioxide concentration of the seawater discharged from the water tank TK. V denotes a water tank volume of the water tank TK.

$$V \frac{dAlk_3}{dt} = Q_1 Alk_1 + Q_2 Alk_2 - Q_3 Alk_3$$

$$V \frac{dCt_3}{dt} = Q_1 Ct_1 + Q_2 Ct_2 - Q_3 Ct_3$$

The acid injection model calculates a molar concentration [mol/L] of proton ($H^+$) from the amount of injection [ml/min], concentration [%], dilution rate, and molecular weight of added acid such as sulfuric acid using the following expression.

Proton($H^+$)molar concentration[mol/L]=$2 \times Ch \times$dilution rate/1000/molecular weight Further, the model is established so that the alkali concentration immediately after the addition of acid is calculated using the molar concentration of the proton ($H^+$) as follows.

$$Alk_4 = \frac{Alk_3 \times Q_3 - [H^+] \times Qh \times 60/1000000}{Q_3 + Qh}$$

Likewise, the alkaline injection model is established so that a molar concentration of alkali ($OH^-$) is calculated, and using the molar concentration of alkali, an alkali concentration immediately after addition of the alkali is calculated.

The RO membrane ion separation model is established so that the total carbon dioxide concentration and the alkalinity of the desalted water discharged from the first reverse osmosis membrane 12 are calculated from the following expression using an alkalinity permeability ratio A1 of the first reverse osmosis membrane 12 and a total carbon dioxide concentration permeability ratio C1.

Alk5=Alk4×permeability ratio $A1$,Alk6=Alk4×(1−permeability ratio $A1$)

$Ct5=Ct4$×permeability ratio $C1,Ct6=Ct4$×(1−permeability ratio $C1$)

Likewise, the second reverse osmosis membrane 14 is also established so that the total carbon dioxide concentration and the alkalinity of the desalted water discharged from the second reverse osmosis membrane 14 are calculated using an alkalinity permeability degree A2 and a total carbon dioxide concentration permeability ratio C2.

Using the above models, the transfer functions P11, P12, P21, P22 are calculated from the relationship between the target values Y1, Y2 and the acid injection rate U1 and the alkaline injection rate U2. The controller CTR is configured to calculate the acid injection rate U1 and the alkaline injection rate U2 from the above expression (1), and based on the calculation result, adjust the amounts of acid and alkaline agents injected into the flow path by the injection device 40 and the injection device 50.

When the acid injection rate U1 is adjusted according to pH at the entrance of the first reverse osmosis membrane 12 and the alkaline injection rate U2 is adjusted according to pH at the entrance of the second reverse osmosis membrane 14, and the injection amount of them each is independently controlled, the amount of chemical injection may be excessive.

On the other hand, when the target values Y1, Y2 are set, and the above multivariable control having two inputs and two outputs is performed, the amount of chemical injection can be prevented from being excessive.

In other words, according to the seawater desalination apparatus and the chemical injection apparatus of the present embodiment, the seawater desalination apparatus and the chemical injection apparatus for avoiding excessive chemical injection by controlling the amount of chemical injection can be provided.

Subsequently, a seawater desalination apparatus and a chemical injection apparatus according to a second embodiment will be explained with reference to drawings. In the explanation below, the same elements as those of the seawater desalination apparatus and the chemical injection apparatus according to the first embodiment are denoted with the same reference numerals, and description thereabout is omitted.

Figure 4:
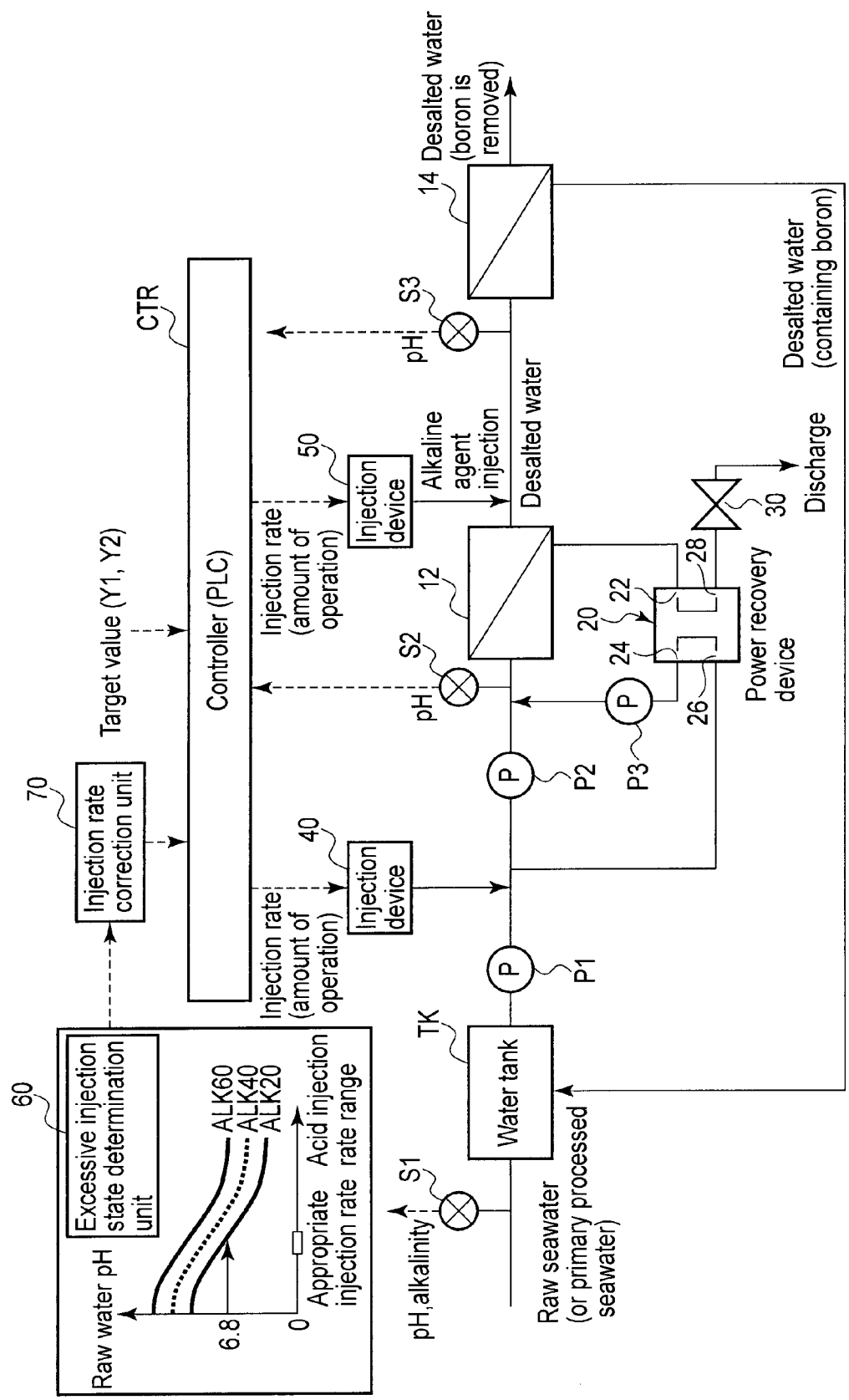
FIG. 4 is a diagram schematically illustrating an example of the configuration of a seawater desalination apparatus according to a second embodiment.

FIG. 4 illustrates an example of the configuration of a seawater desalination apparatus and a chemical injection apparatus according to the present embodiment. In this example, appropriate range of injection rates of acid and alkali is set in advance. The seawater desalination apparatus shown in FIG. 4 includes an excessive injection state determination unit 60 and an injection rate correction unit 70. The excessive injection state determination unit 60 includes an acid injection curve representing relationship between pH of raw seawater and an acid injection rate for each alkalinity and an alkaline injection curve representing relationship between pH of raw seawater and an alkaline injection rate for each alkalinity. The excessive injection state determination unit 60 monitors whether the acid injection rate and the alkaline injection rate obtained from the acid injection curve and the alkaline injection curve are within appropriate injection rate ranges or not. When the excessive injection state determination unit 60 determines that they are not in the appropriate injection rate range, the injection rate correction unit 70 corrects the acid injection rate and the alkaline injection rate.

The excessive injection state determination unit 60 receives the alkalinity and pH measured by the sensor S1. The excessive injection state determination unit 60 is configured to select an acid injection curve on the basis of the alkalinity transmitted from the sensor S1, and calculate an acid injection rate on the basis of the selected acid injection curve and pH transmitted from the sensor S1. Further, the excessive injection state determination unit 60 is configured to determine whether the calculated acid injection rate is within the appropriate injection rate range or not, and when it is determined not to be in the appropriate injection range, the excessive injection state determination unit 60 is configured to output a signal (or the amount of correction) for increasing or decreasing the acid injection rate to the injection rate correction unit 70.

The injection rate correction unit 70 is configured to correct the acid injection rate calculated by the controller CTR, when the injection rate correction unit 70 receives the signal (or the amount of correction) for increasing or decreasing the acid injection rate from the excessive injection state determination unit 60.

The excessive injection state determination unit 60 is also configured to determine whether the alkaline injection rate is within the appropriate injection rate range. The injection rate correction unit 70 is also configured to correct the alkaline injection rate calculated by the controller CTR when the alkaline injection rate is not within the appropriate injection rate range.

As described above, the appropriate acid injection rate range is set on the basis of the alkalinity and pH of the raw seawater, and when the value is out of the range, the amount of used chemical is determined to be excessive. Accordingly, warning can be given, or the acid injection and the alkaline injection can be automatically controlled by correcting the injection rates.

In other words, according to the seawater desalination apparatus and the chemical injection apparatus of the present embodiment, the seawater desalination apparatus and the chemical injection apparatus for avoiding excessive chemical injection by controlling the amount of chemical injection can be provided.

Subsequently, a seawater desalination apparatus and a chemical injection apparatus according to a third embodiment will be explained with reference to the drawings.

Figure 5:
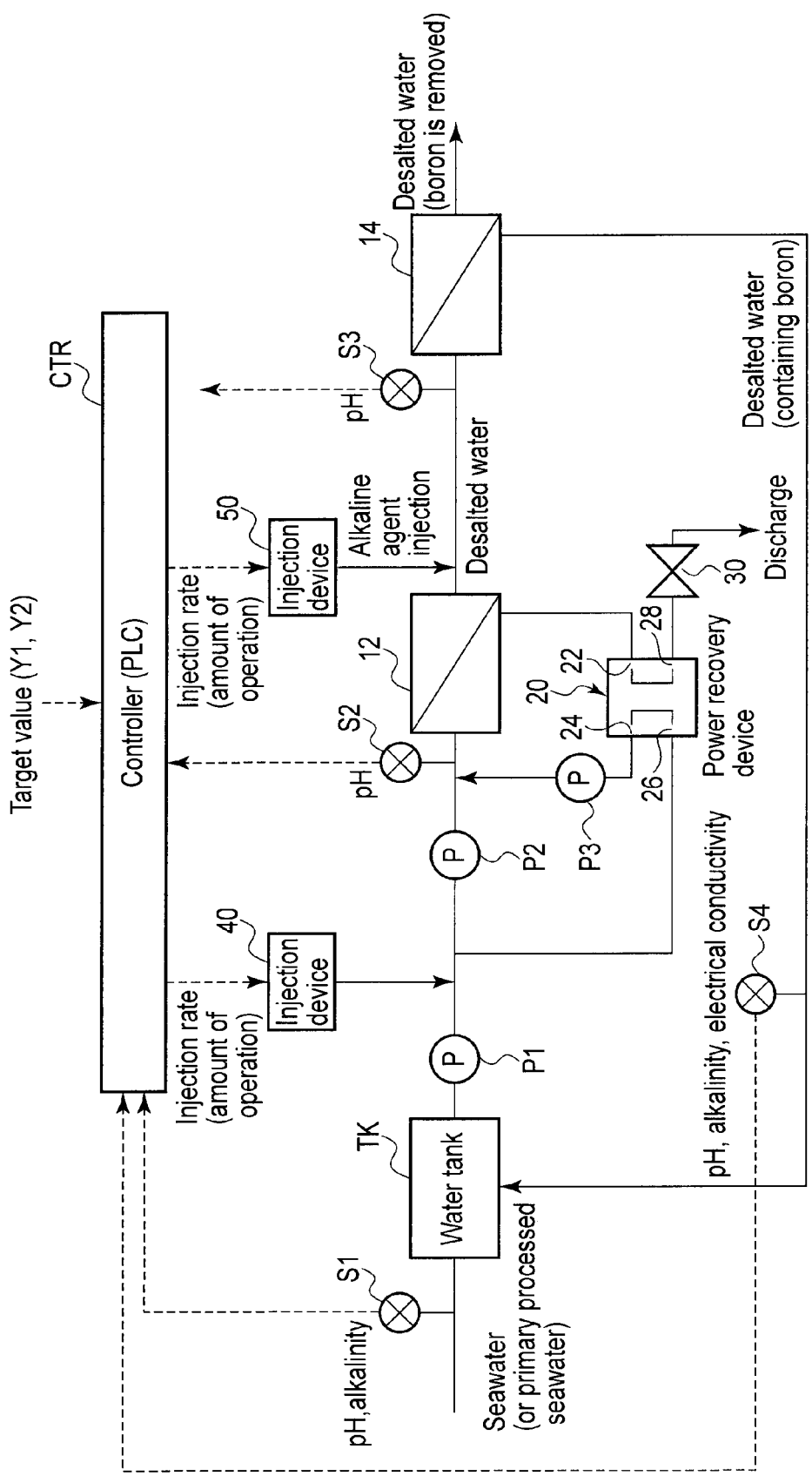
FIG. 5 is a diagram schematically illustrating an example of the configuration of a seawater desalination apparatus according to a third embodiment.

FIG. 5 illustrates an example of the configuration of a seawater desalination apparatus and a chemical injection apparatus according to the present embodiment. The seawater desalination apparatus according to the present embodiment further includes a sensor S4 for measuring electrical conductivity, pH, and alkalinity of the brine water of the second reverse osmosis membrane 14. The pH, alkalinity, and electrical conductivity measured by the sensor S4 are transmitted to the controller CTR.

The controller CTR is configured to obtain the values of electrical conductivity, pH, and alkalinity measured by the sensor S4, and determine the hydrophilicity of boron in the brine water of the second reverse osmosis membrane 14 from these values. The controller CTR is configured to calculate an acid injection curve representing relationship between pH of raw seawater and an acid injection rate for each alkalinity and an alkaline injection curve representing relationship between pH of raw seawater and an alkaline injection rate for each alkalinity from the values measured by the sensor S1 and the acid injection rate. The controller CTR is configured to set the appropriate injection rate ranges of the acid injection curve and the alkaline injection curve calculated from the values measured by the sensor S4.

For example, boron removal performance with respect to pH, alkalinity, and electrical conductivity may be measured in advance, and a software sensor for estimating the appropriate injection rate ranges from pH, alkalinity, and electrical conductivity may be used.

The controller CTR is configured to determine whether the acid injection rate and the alkaline injection rate are within the appropriate injection rate ranges, thereby determining excessive injection state or not.

As described above, since the controller CTR is configured to obtain the pH, alkalinity, and electrical conductivity in the brine water of the second reverse osmosis membrane 14, it is not necessary to prepare the acid injection curve and the alkaline injection curve in advance.

In other words, according to the seawater desalination apparatus and the chemical injection apparatus of the present embodiment, the seawater desalination apparatus and the chemical injection apparatus for avoiding excessive chemical injection by controlling the amount of chemical injection can be provided.

Subsequently, a seawater desalination apparatus and a chemical injection apparatus according to a fourth embodiment will be explained with reference to the drawings.

Figure 6:
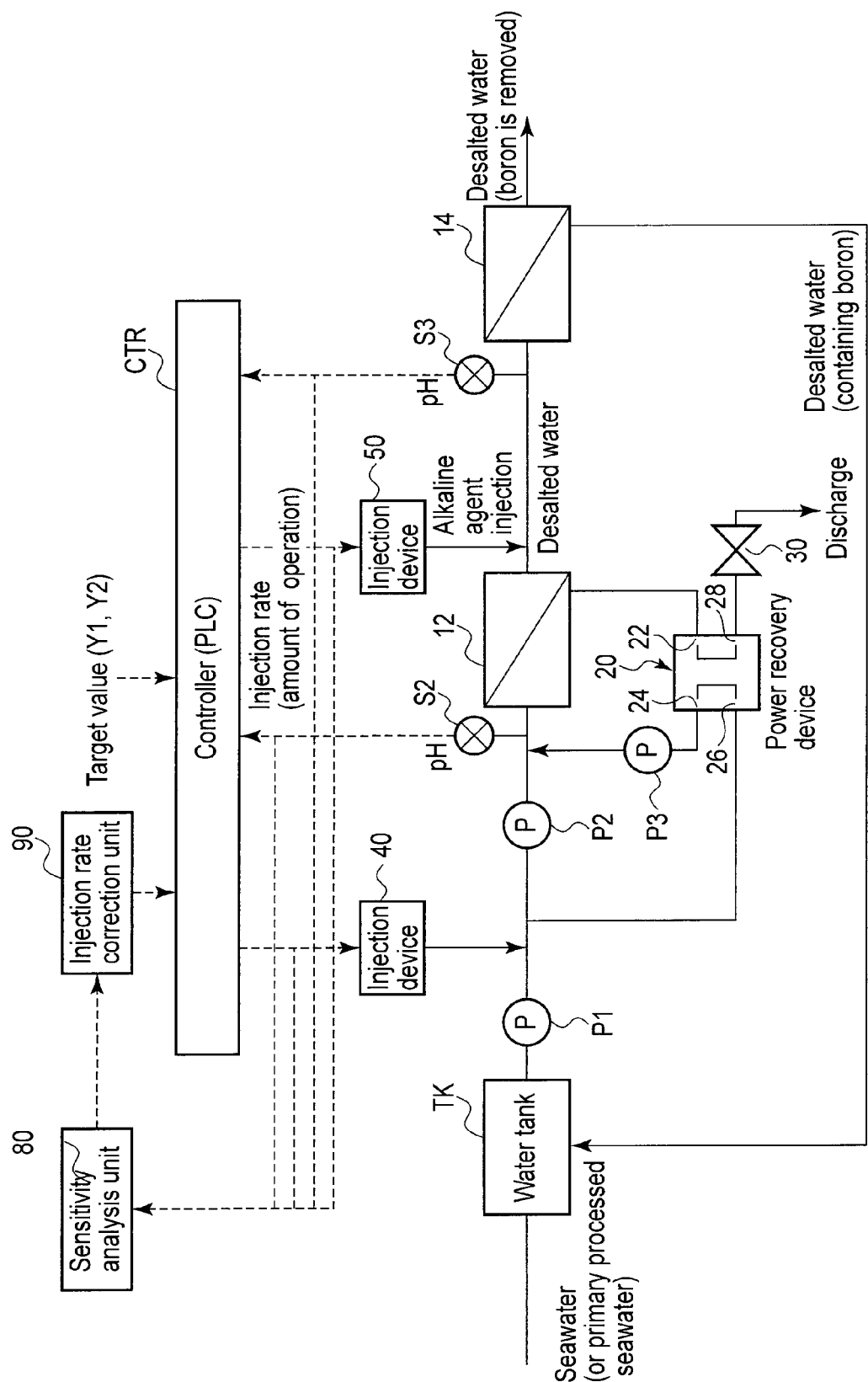
FIG. 6 is a diagram schematically illustrating an example of the configuration of a seawater desalination apparatus according to a fourth embodiment.

FIG. 6 illustrates an example of the configuration of a seawater desalination apparatus and a chemical injection apparatus according to the present embodiment. The seawater desalination apparatus according to the present embodiment further includes sensitivity analysis unit 80 and injection rate correction unit 90.

The sensitivity analysis unit 80 is configured to obtain change of the injection rate of the first injection device 40 and the second injection device 50 and change of pH measured by the sensors S2, S3, and determine excessive injection state using a response sensitivity of pH to change of an injection rate as an index.

Various kinds of sensitivity indexes may be used. For example, a relative gain (index of interference) $\lambda 11$ as shown in FIG. 7 and the like may be used as the sensitivity index. The relative gain is an index of interference, and is represented as a ratio between a transfer function Y1/U1 (open) of an open feedback loop and a transfer function Y1/U1 (close) of a closed feedback loop. When it is close to 1, the interference can be determined to be small (i.e., not excessive injection). It should be noted that a transfer function for the closed loop can be obtained by performing calculation while disregarding the complete mixing model as explained in the above first embodiment.

It should be noted that FIG. 7 illustrates a relative gain serving as a sensitivity index with respect to change of an acid injection rate, but a relative gain serving as a sensitivity index with respect to change of the alkaline injection rate can also be calculated in the same manner from pH Y2 at the entrance of the second reverse osmosis membrane 14 and an alkaline injection rate U2.

The injection rate correction unit 90 corrects the injection rates U1, U2 of the first injection device 40 and the second injection device 50 measured by the controller CTR on the basis of the determination result provided by the sensitivity analysis unit 80. For example, when the sensitivity analysis unit 80 determines that the interference is strong, this is determined to be excessive injection, and the injection rates U1, U2 are corrected to be decreased.

As described above, when the sensitivity analysis unit 80 and the injection rate correction unit 90 are arranged in addition, the seawater desalination apparatus and the chemical injection apparatus for avoiding excessive chemical injection can be provided. Further, the number of sensors required in the present embodiment is less than those required in the seawater desalination apparatus and the chemical injection apparatus according to the first to third embodiments. Therefore, in the present embodiment, the seawater desalination apparatus and the chemical injection apparatus requiring less initial investment cost can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A seawater desalination apparatus comprising:
a first reverse osmosis membrane configured to filter seawater to separate seawater into desalted water and concentrated seawater, and discharge the desalted water and the concentrated seawater;
a second reverse osmosis membrane configured to filter the desalted water to remove boron;
a first injection device configured to inject acid into a stage previous to the first reverse osmosis membrane;
a second injection device configured to inject alkali to a stage previous to the second reverse osmosis membrane;
a first sensor configured to measure pH at an entrance of the first reverse osmosis membrane;
a second sensor configured to measure pH at an entrance of the second reverse osmosis membrane; and
a controller configured to obtain values measured by the first sensor and the second sensor, receive a pH target value at the entrance of the first reverse osmosis membrane and a pH target value at the entrance of the second reverse osmosis membrane, and use a transfer function of the acid injection rate with respect to the target value of pH at the entrance of the first reverse osmosis membrane, a transfer function of the alkaline injection rate with respect to the target value of pH at the entrance of the first reverse osmosis membrane, a transfer function of the acid injection rate with respect to the target value of pH at the entrance of the second reverse osmosis membrane, and a transfer function of the alkaline injection rate with respect to the target value of pH at the entrance of the second reverse osmosis membrane, to control an injection rate of the acid injected from the first injection device and an injection rate of the alkali injected from the second injection device,
wherein brine water of the second osmosis membrane is fed to a stage previous to the first reverse osmosis membrane.

2. A seawater desalination apparatus comprising:
a first reverse osmosis membrane configured to filter seawater to separate seawater into desalted water and concentrated seawater, and discharge the desalted water and the concentrated seawater;
a second reverse osmosis membrane configured to filter the desalted water to remove boron;
a water tank configured to accumulate the raw seawater and the desalted water containing boron discharged from the second reverse osmosis membrane;
a first injection device configured to inject acid into a stage previous to the first reverse osmosis membrane;
a second injection device configured to inject alkali to a stage previous to the second reverse osmosis membrane;
a first sensor configured to measure pH at an entrance of the first reverse osmosis membrane;
a second sensor configured to measure pH at an entrance of the second reverse osmosis membrane;
a controller configured to obtain values measured by the first sensor and the second sensor, receive a pH target value at the entrance of the first reverse osmosis membrane and a pH target value at the entrance of the second reverse osmosis membrane, and use a transfer function of the acid injection rate with respect to the target value of pH at the entrance of the first reverse osmosis membrane, a transfer function of the alkaline injection rate with respect to the target value of pH at the entrance of the first reverse osmosis membrane, a transfer function of the acid injection rate with respect to the target value of pH at the entrance of the second reverse osmosis membrane, and a transfer function of the alkaline injection rate with respect to the target value of pH at the entrance of the second reverse osmosis membrane, to control an injection rate of the acid injected from the first injection device and an injection rate of the alkali injected from the second injection device;
a third sensor configured to measure pH and alkalinity of the raw seawater;
an excessive injection state determination unit configured to include an acid injection curve representing relationship between the pH of the raw seawater and the acid injection rate of the first injection device for each alkalinity and an alkaline injection curve representing relationship between the pH of the raw seawater and the alkaline injection rate of the second injection device for each alkalinity, and monitors the acid injection rate and the alkaline injection rate obtained from the acid injection curve and the alkaline injection curve to determine whether the acid injection rate and the alkaline injection rate are within an appropriate injection rate range; and
an injection rate correction unit configured to correct the acid injection rate and the alkaline injection rate when the excessive injection state determination unit determines that the acid injection rate and the alkaline injection rate are not within the appropriate injection rate range,
wherein brine water of the second osmosis membrane is fed to a stage previous to the first reverse osmosis membrane.

3. A seawater desalination apparatus comprising:
a first reverse osmosis membrane configured to filter seawater to separate seawater into desalted water and concentrated seawater, and discharge the desalted water and the concentrated seawater;
a second reverse osmosis membrane configured to filter the desalted water to remove boron;
a water tank configured to accumulate the raw seawater and the desalted water containing boron discharged from the second reverse osmosis membrane;
a first injection device configured to inject acid into a stage previous to the first reverse osmosis membrane;
a second injection device configured to inject alkali to a stage previous to the second reverse osmosis membrane;
a first sensor configured to measure pH at an entrance of the first reverse osmosis membrane;
a second sensor configured to measure pH at an entrance of the second reverse osmosis membrane;
a controller configured to control an acid injection rate of the first injection device and an alkaline injection rate of the second injection device, based on measured values of the first sensor and the second sensor;
a controller configured to obtain values measured by the first sensor and the second sensor, receive a pH target value at the entrance of the first reverse osmosis membrane and a pH target value at the entrance of the second reverse osmosis membrane, and use a transfer function of the acid injection rate with respect to the target value of pH at the entrance of the first reverse osmosis membrane, a transfer function of the alkaline injection rate with respect to the target value of pH at the entrance of the first reverse osmosis membrane, a transfer function of the acid injection rate with respect to the target value of pH at the entrance of the second reverse osmosis membrane, and a transfer function of the alkaline injection rate with respect to the target value of pH at the entrance of the second reverse osmosis membrane, to control an injection rate of the acid injected from the first injection device and an injection rate of the alkali injected from the second injection device;

a third sensor configured to measure pH and alkalinity of the raw seawater; and a fourth sensor configured to measure an electrical conductivity of the desalted water supplied to the water tank from the second reverse osmosis membrane, wherein the controller is configured to obtain a value measured by the fourth sensor and determine hydrophilicity of the boron in the desalted water supplied to the water tank from the second reverse osmosis membrane and brine water of the second osmosis membrane is fed to a stage previous to the first reverse osmosis membrane.

* * * * *